US012404006B2

(12) United States Patent
Thorwald

(10) Patent No.: US 12,404,006 B2
(45) Date of Patent: Sep. 2, 2025

(54) TEXTILE AIRFOIL STRUCTURE FOR A WING SYSTEM, AND TRANSPORT DEVICE

(71) Applicant: Bastian Thorwald, Nuremberg (DE)

(72) Inventor: Bastian Thorwald, Nuremberg (DE)

( * ) Notice: Subject to any disclaimer, the term of this patent is extended or adjusted under 35 U.S.C. 154(b) by 0 days.

(21) Appl. No.: 18/044,911

(22) PCT Filed: Dec. 23, 2021

(86) PCT No.: PCT/EP2021/087511
§ 371 (c)(1),
(2) Date: Mar. 10, 2023

(87) PCT Pub. No.: WO2022/179743
PCT Pub. Date: Sep. 1, 2022

(65) Prior Publication Data
US 2023/0356826 A1 Nov. 9, 2023

(30) Foreign Application Priority Data
Feb. 26, 2021 (DE) ...................... 10 2021 104 663.7

(51) Int. Cl.
B64C 3/30 (2006.01)
B60F 5/02 (2006.01)
(Continued)

(52) U.S. Cl.
CPC ................. B64C 3/30 (2013.01); B60F 5/02 (2013.01); B64C 3/56 (2013.01); B64C 9/02 (2013.01);
(Continued)

(58) Field of Classification Search
CPC .............................. B64C 3/30; B64C 4637/00
See application file for complete search history.

(56) References Cited

U.S. PATENT DOCUMENTS 3,473,761 A 10/1969 Chutter
4,725,021 A 2/1988 Priddy
(Continued)

FOREIGN PATENT DOCUMENTS

CN 1847089 A 10/2006
CN 206231175 U 6/2017
(Continued)

OTHER PUBLICATIONS

International Search Report and Written Opinion received for PCT Serial No. PCT/EP2021/087511 on Mar. 23, 2022, 19 pgs.

Primary Examiner — Nicholas McFall
(74) Attorney, Agent, or Firm — Merchant & Gould P.C.

(57) ABSTRACT

A wing system includes an aerodynamic wing structure which is stowable. The wing structure which can be rolled up and/or folded, including at least one pressure-tight tubular pressure chamber which is made of a flexible material and extends preferably along the wingspan of the wing structure. A tear-resistant outer skin fabric encases the wing structure. The pressure chamber of the wing structure can be filled with a fluid, and the wing system includes a high-pressure pump system. The fluid is kept in the pressure chamber under high pressure, such as over 50 bar, over 100 bar, or over 150 bar. A transport device is for use as an aircraft for traveling in the air and as a vehicle for traveling on land. The transport device includes the wing system, with the wing system being attached preferably to the upper face of the transport device.

11 Claims, 13 Drawing Sheets

Figure 1E:
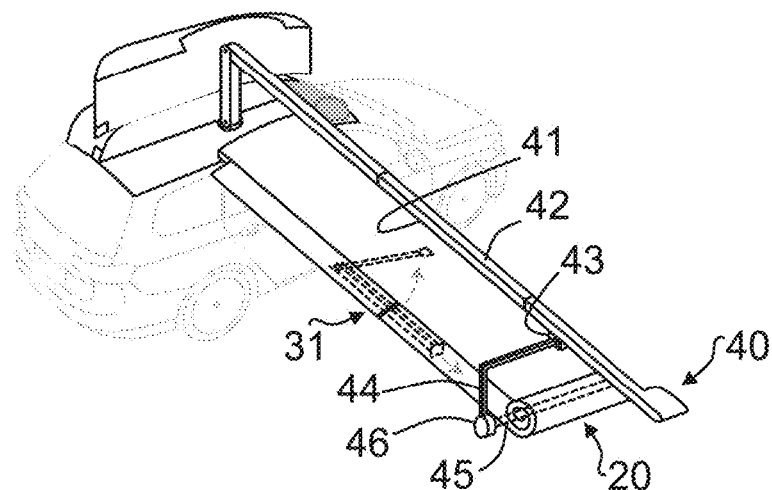

(51) Int. Cl.
    *B64C 3/56*            (2006.01)
    *B64C 9/02*            (2006.01)
    *B64C 9/14*            (2006.01)
    *B64C 37/00*          (2006.01)
    *B64D 27/24*          (2024.01)
    *B64D 27/357*        (2024.01)
    *B64U 30/12*          (2023.01)

(52) U.S. Cl.
    CPC ................ *B64C 9/14* (2013.01); *B64C 37/00* (2013.01); *B64D 27/24* (2013.01); *B64D 27/357* (2024.01); *B64U 30/12* (2023.01)

(56) References Cited

U.S. PATENT DOCUMENTS

| | | | |
|---|---|---|---|
| 6,508,036 B1 | 1/2003 | Cadogan | |
| 9,216,813 B2 | 12/2015 | Wlezien | |
| 10,676,172 B1 | 6/2020 | Keavney | |
| 2004/0069907 A1* | 4/2004 | Dockter | B64C 3/46 244/218 |
| 2005/0151007 A1 | 7/2005 | Cadogan | |
| 2006/0060706 A1 | 3/2006 | Elam | |
| 2014/0255189 A1* | 9/2014 | Lutke | B64C 3/30 416/1 |
| 2020/0010209 A1 | 1/2020 | Bender | |

FOREIGN PATENT DOCUMENTS

| | | |
|---|---|---|
| DE | 19907791 A1 | 10/1999 |
| DE | 102015014319 A1 | 5/2017 |
| WO | 2017076498 A1 | 5/2017 |

* cited by examiner

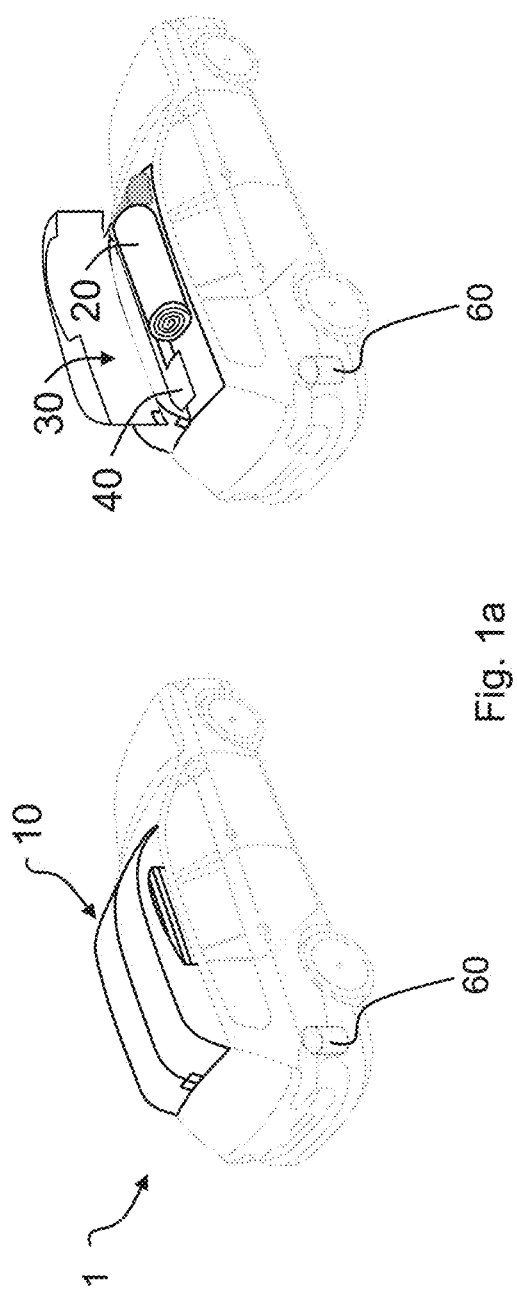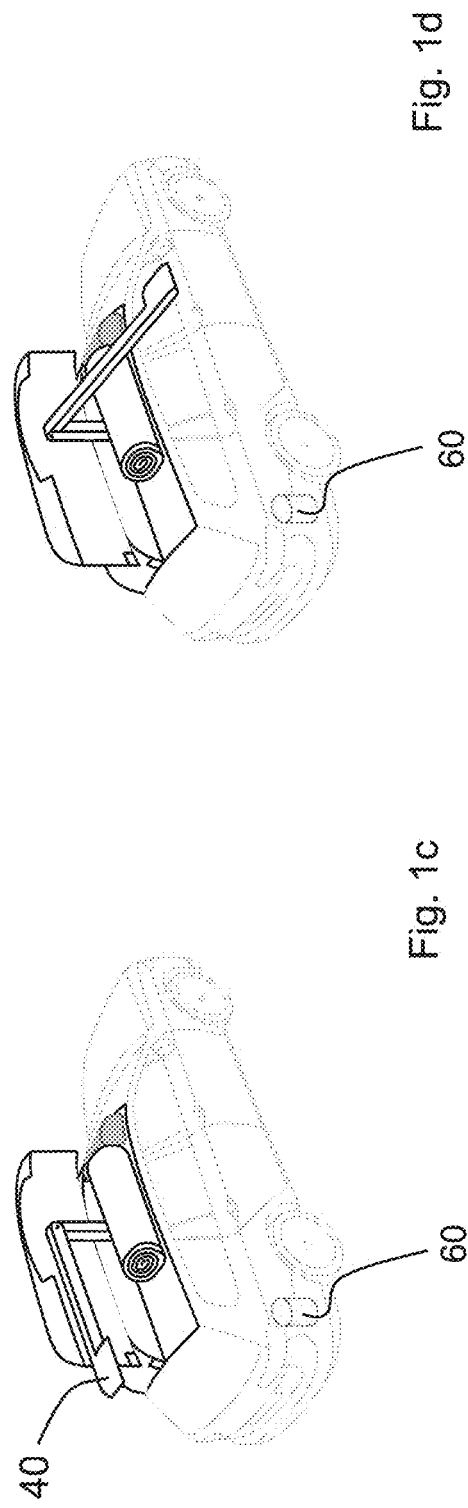

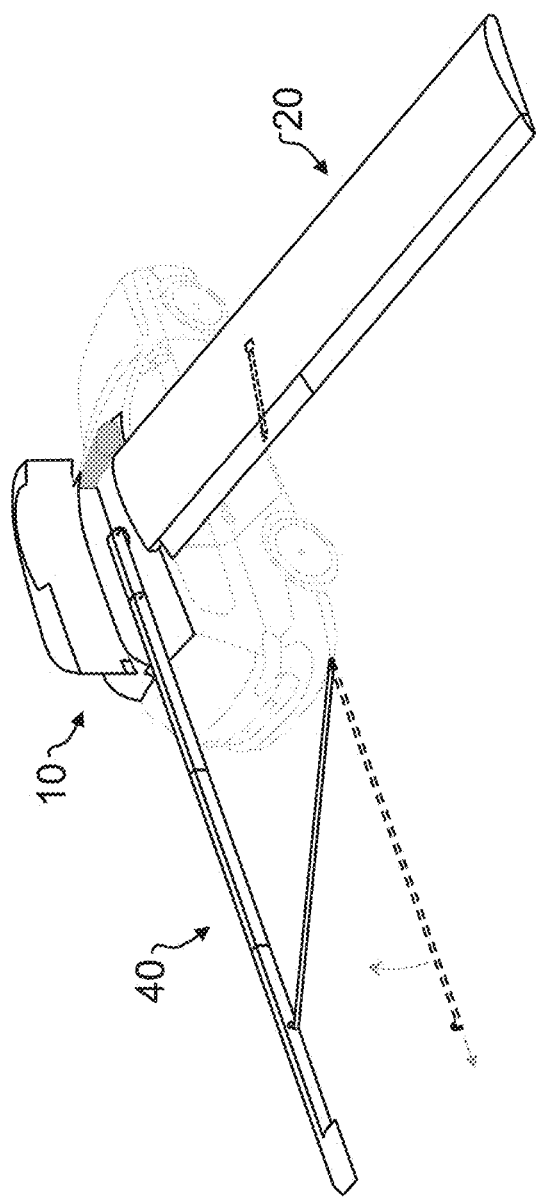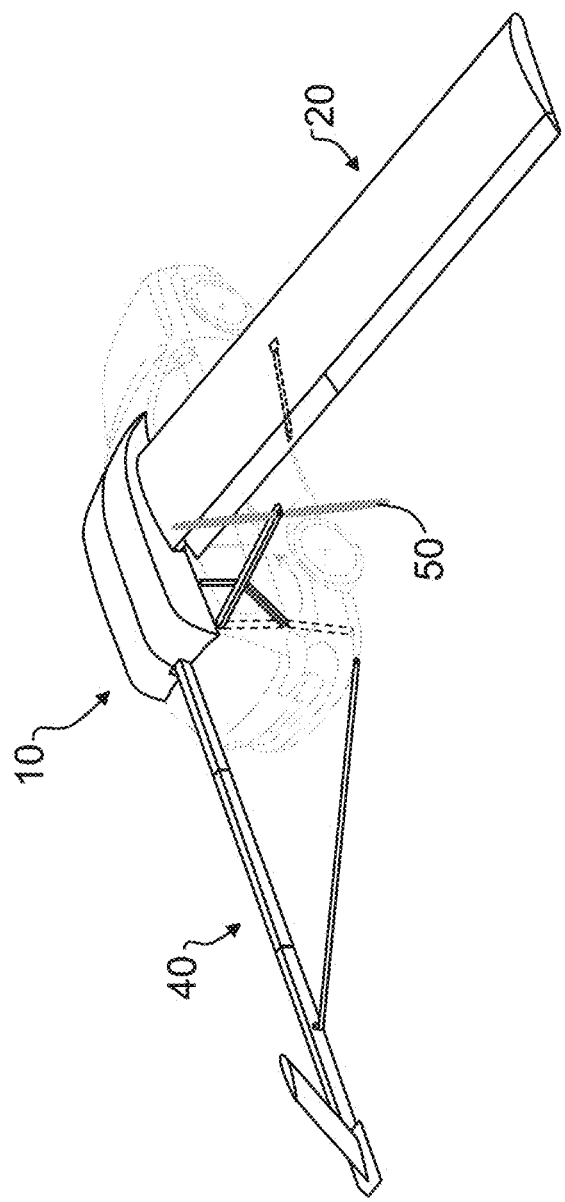

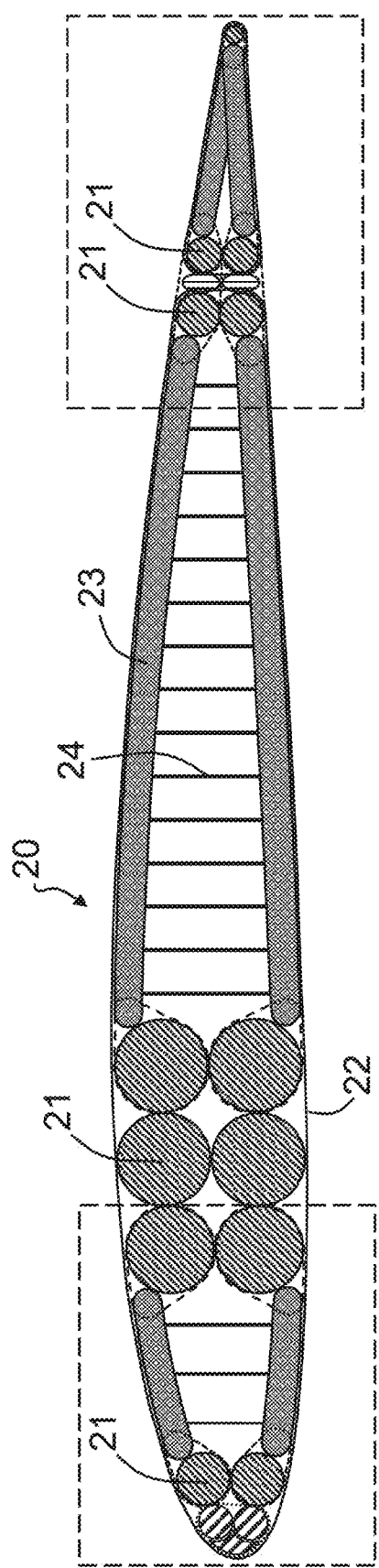
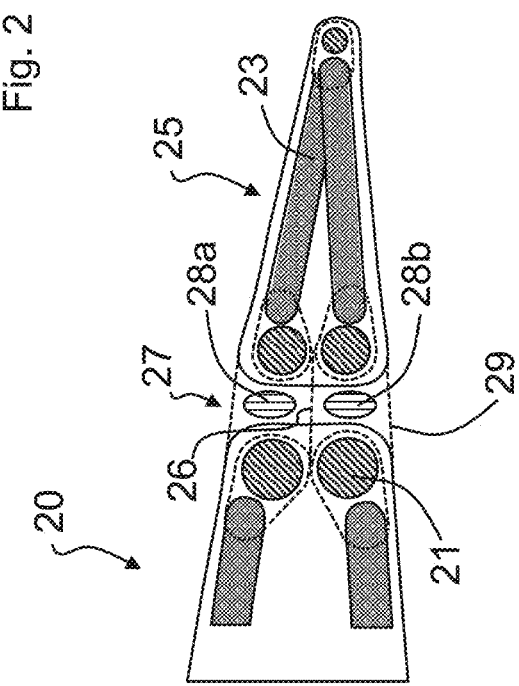
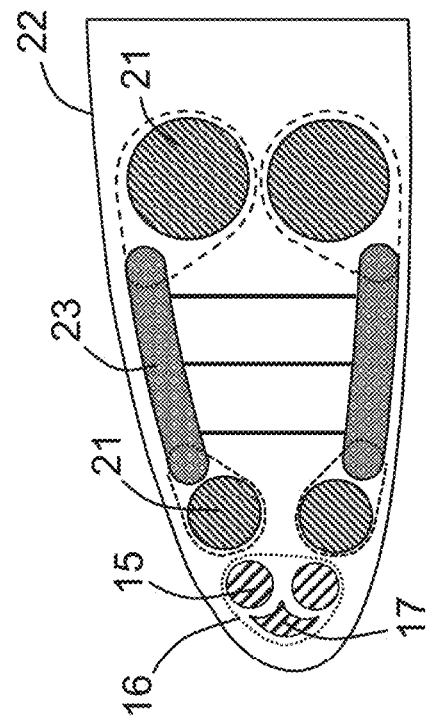
Fig. 2
Fig. 3b
Fig. 3a

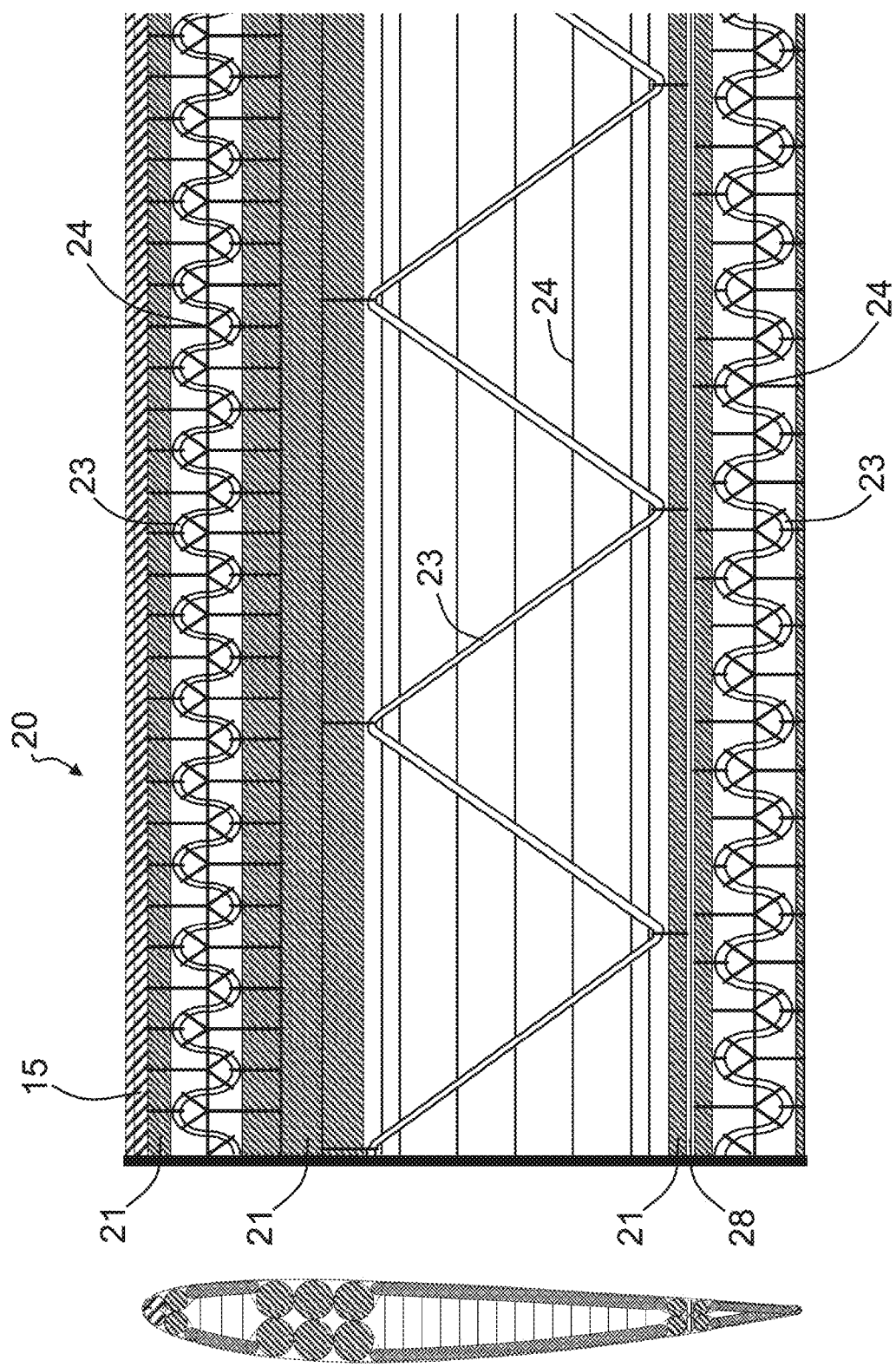

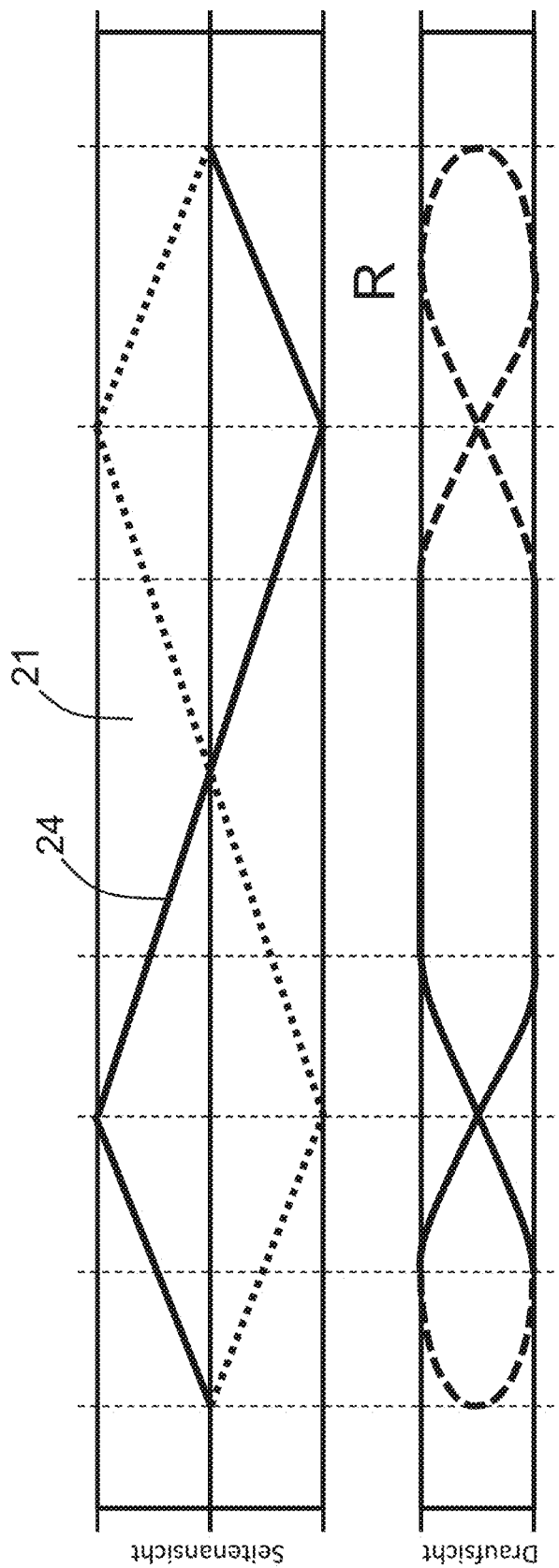
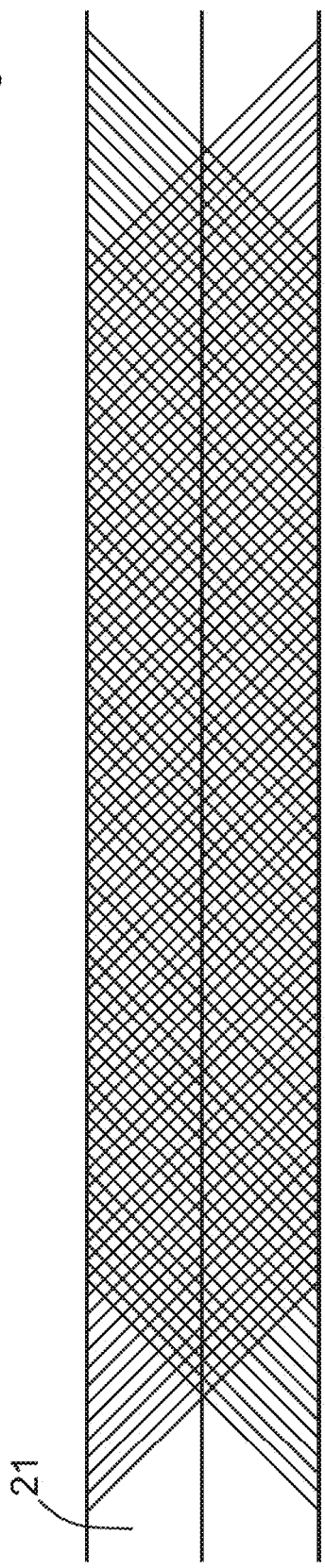

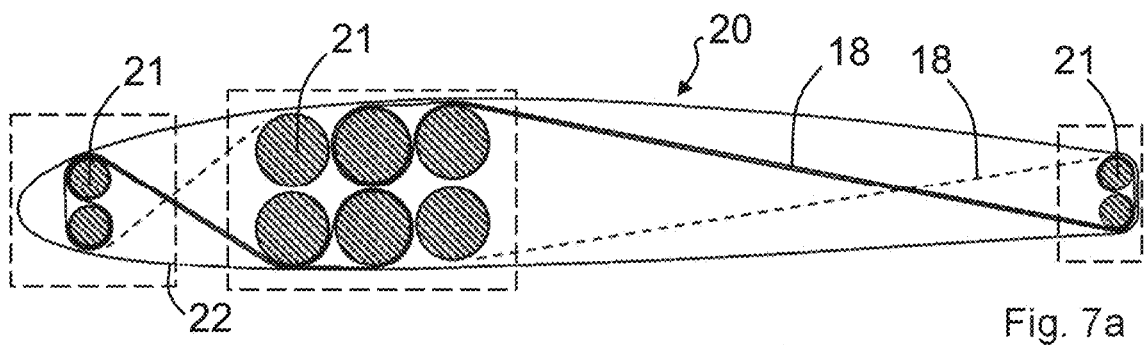
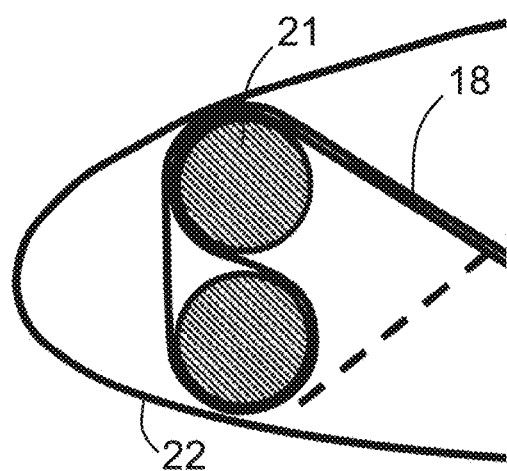
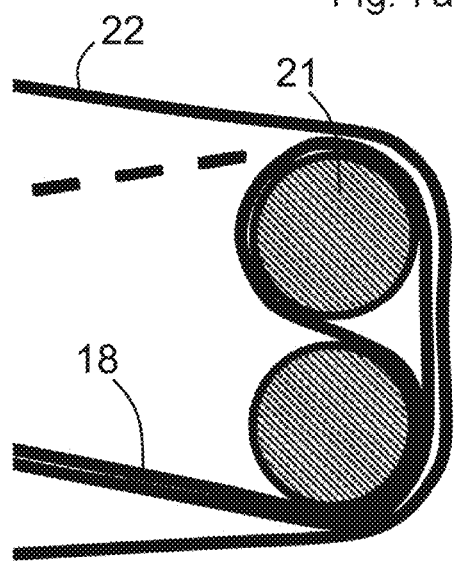
Fig. 7b Fig. 7c
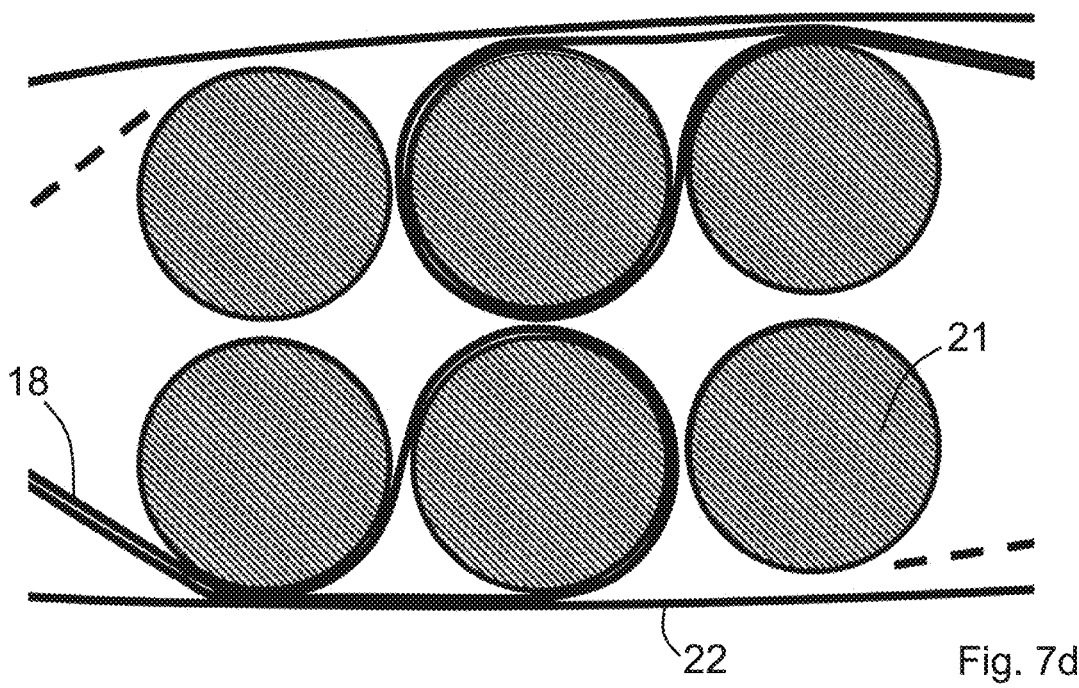
Fig. 7d

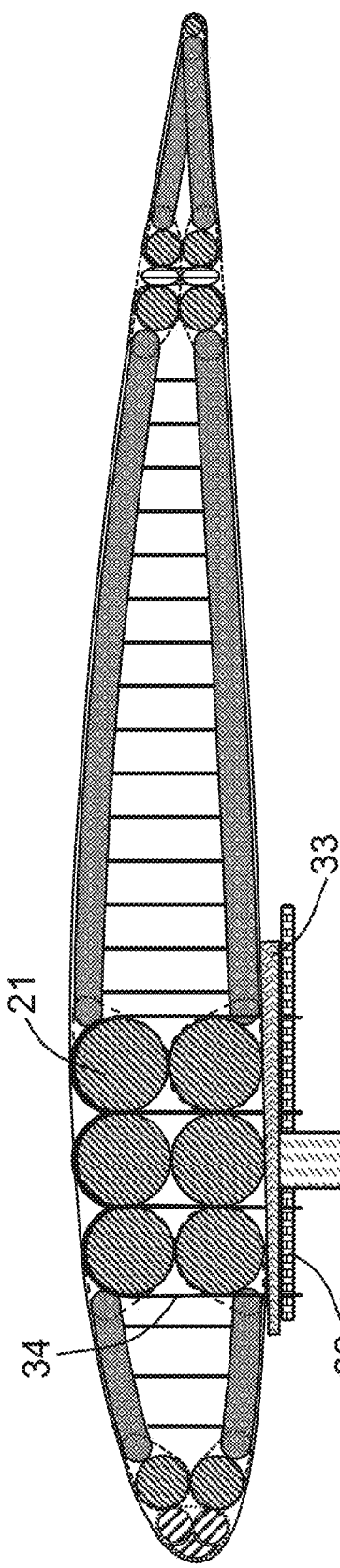
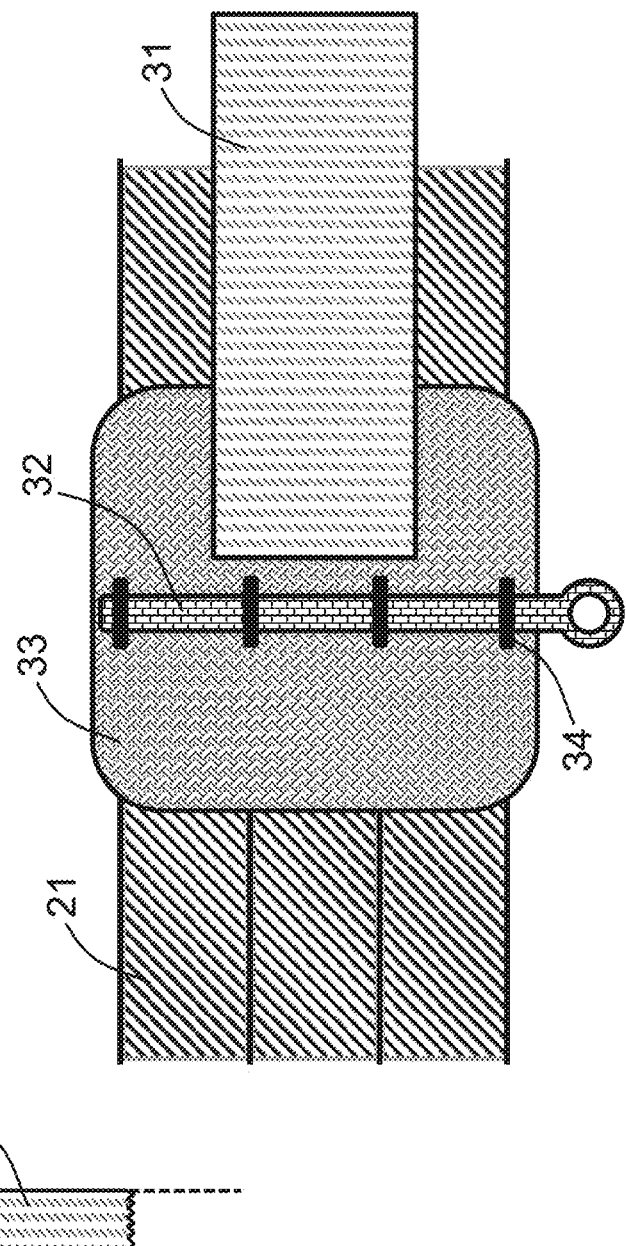

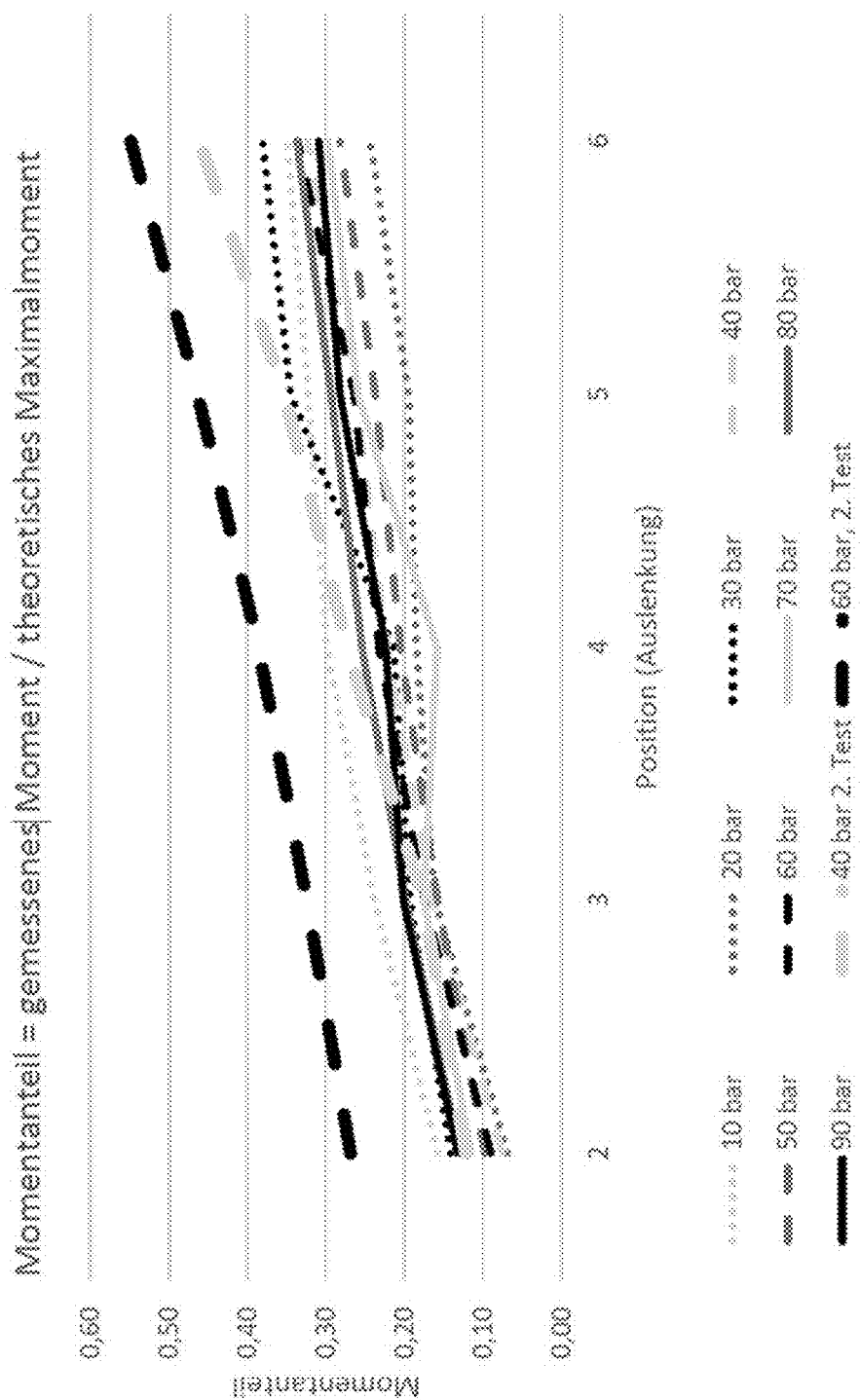

Eingaben:

| | |
|---|---|
| Fahrzeuggewicht (exkl. Druckflüssigkeit) | 2200 kg |
| Zuladung | 400 kg |
| Halbspannweite | 5 m |
| Relative Spannweitenkoordinate der Abstützung | 0,4 |
| Abstand zwischen Aufhängung der Abstützung und Flügel am Auto | 1,7 m |
| Winkel der Abstützung zur Vertikalen | 0,87 rad    49,6 |
| Flügeltiefe | 1,6 m |
| Maximales Lastvielfaches | 3,6 g |
| Wasserdichte | 997 kg/m^3 |
| Lastfaktor | 0,6 |

Holme, Flügelhöhe NACA2412 (bei x in relativer Flügeltiefen-Koordinate)

| | |
|---|---|
| x=0,05 | 0,114 m |
| x=0,19 | 0,181 m |
| x=0.25 | 0,190 m |
| x=0.31 | 0,191 m |
| x=0.79 | 0,087 m |

Klappe, Flügelhöhe NACA2412 (bei x in relativer Flügeltiefen-Koordinate)

| | |
|---|---|
| x=0,83 | 0,073 m |

Querschnittsfläche eines Schlauchs eines Holms (Tragfläche)

| | |
|---|---|
| Holm 1 | 0,00256 m^2 |
| Holm 2 | 0,00646 m^2 |
| Holm 3 | 0,00711 m^2 |
| Holm 4 | 0,00719 m^2 |
| Holm 5 | 0,00150 m^2 |

Volumen beider Schläuche der Holme (Tragfläche)

| | |
|---|---|
| Holm 1 | 0,026 m^3 |
| Holm 2 | 0,065 m^3 |
| Holm 3 | 0,071 m^3 |
| Holm 4 | 0,072 m^3 |
| Holm 5 | 0,015 m^3 |

Querschnittsfläche eines Schlauchs eines Holms (Klappe)

| | |
|---|---|
| Holm 1 | 0,00415 m^2 |

Volumen beider Schläuche des Holms (Klappe)

| | |
|---|---|
| Holm 1 | 0,005 m^3 |

Volumen des Schlauchs am Ende der Klappe (D=0,01m)

| | |
|---|---|
| | 0,000 m^3 |

Rippen-Abstützungsschlauch

| | |
|---|---|
| Durchmesser | 0,01 m |
| Anzahl | 5 |
| Querschnittsfläche | 0,000079 m^2 |
| Länge | 7,07 m |

Fig. 10a

| | |
|---|---|
| Volumen gesamt | 0,003 m^3 |
| | |
| Volumen Druckflüssigkeit gesamt (2 Flügel) | 0,513 m^3 |
| MTOW (inkl. Druckflüssigkeit) | 3111 kg |
| | |
| Zwischenergebnisse Flügel | |
| Flügelfläche gesamt | 16 m^2 |
| Last pro Flügel (max-g), exkl. Druckflüssigkeit | 45911 N |
| Flächenbelastung (0 g), inkl. Druckflüssigkeit | 194 kg/m^2 |
| Flächenbelastung (max-g), inkl. Druckflüssigkeit | 700 kg/m^2 |
| | |
| Druckkraft aller Holme (Flügel) | 3695255 N |
| | |
| Abstützung | |
| Vertikalkraft auf Abstützung (max-g) | 36729 N |
| Horizotalkraft auf Abstützung (max-g) | 43210 N |
| Längskraft auf Abstützung (max-g) | 56711 N |
| | |
| Maximale Momente | |
| Moment an Flügelwurzel (max-g), exkl. Druckflüssigkeit | 4591 Nm |
| Moment am Ort der Abstützung (max-g), exkl. Druckflüssigkeit | 41320 Nm |
| | |
| Maximales Moment der Holme pro bar Druck (ideal) | |
| Holm 1 Tragflügel | 29,3 Nm/bar |
| Holm 2 Tragflügel | 117,1 Nm/bar |
| Holm 3 Tragflügel | 135,2 Nm/bar |
| Holm 4 Tragflügel | 137,6 Nm/bar |
| Holm 5 Tragflügel | 13,1 Nm/bar |
| Holm 1 Klappe | 30,2 Nm/bar |
| | |
| Summe | 462,4 Nm/bar |
| | |
| Erforderlicher Druck der Flüssigkeit | |
| Ideal | 89 bar |
| Real | 149 bar |
| | |
| Masse Druckflüssigkeit gesamt (2 Flügel) | 511 kg |

Fig. 10b

TEXTILE AIRFOIL STRUCTURE FOR A WING SYSTEM, AND TRANSPORT DEVICE

CROSS-REFERENCE TO RELATED APPLICATIONS

This application is a National Stage Application of PCT/EP2021/087511, filed 23 Dec. 2021, which claims benefit of Serial No. 10 2021 104 663.7, filed 26 Feb. 2021 in Germany, and which applications are incorporated herein by reference. To the extent appropriate, a claim of priority is made to each of the above disclosed applications.

TECHNICAL FIELD

The present invention relates to a wing system and to a transport device.

BACKGROUND OF THE INVENTION

Efforts are currently being made to expand private transport from the land to the air. Flying taxis, also those which fly autonomously, are known for this purpose. However, these have the disadvantage that they do not replace a family passenger vehicle.

To enable the fastest and most comfortable possible point-to-point private transport over large distances for an entire family using the same means of transportation, certain criteria are to be placed on a flyable family car. Seating space available for at least four persons, a possible cargo load which is sufficient for four persons including baggage. Moreover, a flight range of greater than 300 km is desirable. Suitability for daily use is to be provided, so that it is possible to use a normal parking garage or a carwash. The flyable auto is ideally to be able to fully replace a passenger vehicle in everyday use, so that double acquisition costs are not required. To ensure the maximum aerodynamic efficiency and minimum consumption linked thereto, a fixed wing aircraft is the preferred selection. It is desirable for a flying car to offer properties for short takeoff and landing (STOL), so that the number of usable airfields is maximized.

These requirements already exclude some concepts due to additional features. In addition to the STOL properties, there are flying cars having properties for vertical takeoff and landing (VTOL). VTOL properties are of secondary importance, however, since, on the one hand, external takeoffs and landings are not permitted outside airfields and company premises in Germany. In other countries, such as Switzerland or France, this can be permitted. Even with a VTOL-capable aircraft, it is necessary for takeoff and landing to stop at an airport. However, the VTOL property hardly offers any advantage at an airport over the STOL property. A VTOL property generally requires more complex technology and a higher engine performance than a horizontal takeoff and landing (HTOL). However, this is only disadvantageous in cruising flight, reduces the range, and moreover increases the operating, maintenance, service, and acquisition costs.

Most known concepts for flying cars cannot or are not allowed to drive on normal roads. Since a flying taxi cannot take off and land everywhere, it does not meet the requirement for a "comfortable point-to-point private transport over long distances for the entire family using the same means of transportation". A car is thus desirable which can be converted in a simple manner to form a fixed wing aircraft. However, it is to be able to be used like a normal passenger vehicle in the driving-ready state. Known concepts are not suitable as family passenger vehicles capable of everyday use. The main reason for the inadequacies of the existing fixed wing aircraft concepts in the driving mode is housing the airfoils.

PRIOR ART

An inflatable wing is disclosed in U.S. Pat. No. 4,725,021, which is formed from a pair of tapering, conically inflatable tubes, which are tangentially connected to one another. The tubes are additionally connected to one another by upper and lower reinforcement boards, which have corresponding longitudinal edges lying in the same central diametral plane passing through the associated tube. The reinforcement boards consist of a stiff reinforcement material, such as Kevlar, which is collapsible in a direction parallel to the spanwise axis of the wing upon deflation of the tubes. The stiff reinforcement material cooperates with the inflated tubes to transfer tensile stress caused by the inflation pressure from the tubes to the reinforcement boards. A plurality of rigid hoops shaped to provide airfoil definition are spaced apart from one another and connected to the upper and lower reinforcement boards. Tension cables are used to stabilize the hoops along the trailing and leading edges thereof.

WO 2017076498 A1 describes an aircraft which comprises a fuselage unit and an inflatable airfoil unit, which is arranged in the non-inflated state in the fuselage unit and is positionable in an airfoil position by inflation out of the fuselage unit. The airfoil unit is rolled into the fuselage unit in the non-inflated state and can be unrolled from the fuselage unit by inflation.

A wing structure having inflated plastic rods as a wing is described in CN1847089A, which comprises gas-filled rods that enable the control of the control flap position. For this purpose, six gas-filled rods are described at the connection between wing and control flap, wherein three are provided on the upper side and three on the lower side, so that by inflating the rods on one side and discharging the gas from the rods on the opposite side, the position of the control flap is adjustable in the direction of the deflated rods.

A wing structure inflatable using compressed air for an aircraft is known from U.S. Pat. No. 10,676,172 B1, which is inflatable from a folded stowage position into a usage position. The wing structure comprises spars, which are spaced apart from one another and are fillable with compressed air, as a supporting structure. The wing structure is used to enlarge the wing area during the landing process of the aircraft.

U.S. Pat. No. 3,473,761 teaches an aircraft having a pneumatically filled wing structure, thus filled with a gas, for improving the ratio of strength to weight. For this purpose, the wing has a plurality of closed tubes, which are arranged rigidly fixed in the wing structure and spaced apart from one another in the longitudinal direction of the wing structure.

OBJECT OF THE PRESENT INVENTION

The object of the present invention is to provide a novel wing structure which can be stowed and a transport device, which enable a comparable carrying capacity with increased operational reliability and reduced storage space volume at the same time.

SUMMARY OF THE INVENTION

In a typical structure of an airfoil, there are one or more spars, paneling (skin), ribs, and stringers. The structure of a textile airfoil is the same in principle. However, only pressure tubes filled with gas are known in the prior art. This does not permit high pressures, however, because a bursting tube has a high potential risk and even protective equipment for humans in the immediate vicinity cannot offer sufficient protection.

The subject matter of the invention is a solely textile structure, which is capable of absorbing all forces acting on the airfoil of an aircraft. It can be used in particular as a spar for the airfoil of an aircraft. These spars consist of an arrangement of individual pressure chambers, in particular in the form of a bundle of textile tubes, which are filled with a liquid, such as water, under high pressure and are connected by stretch-resistant bands having high tensile strength so that the composite can absorb high torques, proportional to the pressure in the tubes. An airfoil contains one or more of these spars or pressure chambers for load absorption. To achieve a dimensionally stable wing profile, in addition multiple pressure chambers or pressure tubes are preferably used which assume the task of the ribs and stringers. A textile envelope around all supporting and shaping tubes forms the smooth surface of the wing. With a liquid-filled tube, there is a much lower potential risk than with a gas-filled tube at equal pressure. If a liquid-filled tube fails, only a small amount of liquid escapes due to the low compressibility or in compressibility of the liquid and the low stretching of the pressure tube. This is "caught" by the outer envelope of the main wing, so that it does not represent a danger to persons.

According to the invention, a wing system is provided which comprises an aerodynamic wing structure that can be stowed, having at least one pressure-tight tubular pressure chamber made of a flexible material, which preferably extends along the span width of the wing structure, and a tear-resistant outer skin fabric, which encases the wing structure, wherein characteristically the at least one pressure chamber of the wing structure can be filled with a liquid, and the wing system comprises a high-pressure pump system, in particular wherein the liquid is held in the pressure chamber under high pressure, in particular above 50 bar, in particular above 100 bar, in particular above 150 bar.

The maximum pressure for which the material of the pressure chamber is provided is expediently applied to the pressure chamber. A pressure which is somewhat below the bursting pressure of the pressure chamber can therefore be applied to the pressure chamber.

The respective pressure chamber is in particular tubular, i.e., for example, formed as a tube.

Multiple pressure chambers can be arranged extending adjacent to one another and/or one over another in the filled state. A suitable supporting framework for the wing structure is provided in this way.

To ensure good stability of the wing structure with good ability to roll it or fold it at the same time, the pressure chambers can preferably be fixed in relation to one another or braced in the filled state by means of tension bands, which are preferably textile. Moreover, this design is comparatively simple to implement with regard to the producibility.

Furthermore, to ensure improved stability of the wing structure, some pressure chambers transverse to the span width of the wing structure and further pressure chambers (23) can extend meandering or zigzagging in the direction transverse to the span width along the wing structure.

To fix the location of the pressure chambers, preferably in the direction transverse to the span width, along the wing structure in the unfilled and the filled state of the wing structure, pressure chambers can be connected to one another in sections via bracing threads. In this way, above all the surface stability of the wing structure in the unfolded state can be improved. Bracing threads have the advantage that they do not interfere during the rolling or folding process of the wing structure.

A tubular pressure chamber can have the form of a tube or can be a tube, for example. If a plurality of pressure chambers is arranged in the wing structure, separate liquid circuits can advantageously be provided for the individual pressure chambers.

The supporting elements of a wing are the spars or pressure chambers. In the case of a cantilever arm clamped on one side made of solid material, a tensile force is applied on the load side in the event of a load of the free end and a compressive force is applied on the opposite side. In a liquid-filled tube, the liquid absorbs the compressive force and the fibers on the load side absorb the tensile force. However, this only applies to a limited extent to a single tube, since initially a parallelogram displacement of the fabric occurs, during which only minor counter forces occur in the case of minor deflections. The reason for this is that the area of a parallelogram only shrinks slightly starting from a rectangle in the case of small displacement. In a tube, the inner volume of which remains approximately constant, because it is filled with an incompressible liquid, the weft fibers, which extend in the peripheral direction, are therefore stretched. However, this only occurs to a minor extent in the event of minor deflection. Accordingly, the ability of a single pressure tube to absorb a torque is also low.

To have a resistance against a parallelogram displacement, a bundle made up of, for example, four parallel high-pressure resistant tubes can be provided for the spar. It is advantageous to brace each two tubes lying one over another using bands only in sections in segments adjoining one another or to envelop them with a fabric which has at least two thread systems, which extend at an angle of 45° to the longitudinal axis of the spar. With this bracing, it is also unimportant whether the spar consists of a total of four, six, or more tubes, since they are each connected in pairs.

To further increase the torque absorption, bands can additionally also be attached in the longitudinal direction of the spar, which are guided in parallel in a section on the upper side or the lower side and are guided diagonally downward or upward, respectively, from a certain span width position and/or fastened on the opposite side. Several of these bands can be distributed over the length of the spar. This arrangement has the result that the bands themselves are already loaded strongly with tension even in the event of a minor deflection and therefore increase the resistance against a deflection. In addition, for example, multiple parallel bands on the upper and lower sides close to the fixing on the car reduce the stretching on the tension-loaded side. In this way, they compensate for the compressive force of the water by an equal tensile force in case of a deflection. The tube bundles together with the bands can thus advantageously enable a torque absorption which is proportional to the water pressure in the interior of the tubes.

The theoretical maximum transverse force $F_{max}$, which a pressure tube can absorb in the event of complete relief of one side, is $F_{max}=F_D p/2h$. With the compressive force of the liquid $F_D=p\,A$ equal to the product of pressure p and tube cross-sectional area A, the height of the spar b, and the lever of the engaging force h.

In reality, the bands can stretch, which results in worsening of the torque absorption. If the bands on the upper and the lower side are already stretched in the non-deflected state of the wing by the compressive force of the water, a deflection of the wing does not immediately result in complete relief of the band on the side facing away from the load. The effective tensile force on the load side is therefore reduced by the tensile force which is still applied on the side facing away from the load. The less the stretching of the bands is, the closer one comes to the theoretical maximum transverse force $F_{max}$ in the event of minor deflection.

Ribs or longitudinal profiles of the airfoil can advantageously also consist of pressure tubes and tensioning bands in a textile wing. The middle spar is the main spar. This carries the largest part of the aerodynamic forces which engage in a wing at a fourth of the wing depth. If the loads require it, in addition a front and/or rear spar can be introduced. However, the front and rear spar together only carry a small part of the load and are primarily used for the dimensional stability of the profile.

Pressure chambers or tubes which are filled with air at low pressure can be used for the shaping of the wing leading edge. Since these tubes are located very close to the center plane of the wing, the lever arm is very small. For this reason, they can hardly contribute to absorbing the aerodynamic forces. Because of this, air is used as the pressure medium for these due to the lower weight and the lower requirement for the rigidity. The pressure level is expediently in the range of 3 to 5 bar, so that they are in a harmlessly low range. The pressure tube at the leading edge is filled at even lower pressure, since it expediently does not have a round cross section in order to map the profile on the leading edge of the wing. In order to achieve a defined leading edge radius using this arrangement, it can be necessary to insert the air-filled pressure chambers or tubes into a coarse-meshed net, which results in the desired shape in the tension state.

The wing system can expediently comprise a wing flap, which comprises pressure-tight tubular pressure chambers made of a flexible material, wherein the wing flap is fastened using bands having high tensile strength on the wing structure, wherein the bands extend perpendicularly to the spars from the rear edge of the wing structure to the front edge of the wing flap in such a way that a gap forms between the rear edge of the wing structure and the front edge of the wing flap, wherein at least two actuator pressure chambers, preferably in the form of pressure tubes, are arranged in this gap in parallel to the rear edge of the wing structure, wherein at least one actuator pressure chamber is arranged above and at least one actuator pressure chamber is arranged below the bands.

Liquid-filled pressure chambers or pressure tubes can be used as the actuators for aerodynamic control flaps, for example for the aileron and/or the landing flap. The actuators for actuating the flaps are expediently also designed so they can be rolled up in the presently described construction of the wing structure. The flaps are fastened using bands having high tensile strength, which extend in the longitudinal direction of the wing, thus in the direction of the propulsion, from the rear edge of the wing to the front edge of the flap, so that a gap remains between the rear edge and the front edge. At least two low-pressure tubes are arranged in this gap in parallel to the rear edge of the wing, wherein at least one low-pressure tube is arranged above and at least one further one is arranged below the fastening bands. They can completely fill the gap if both are half-filled with liquid. The actuator pressure chambers can expediently be filled with liquid and can be activated by means of liquid pressures. If a pressure difference of the liquids in the upper and the lower actuator pressure chamber is applied, the wing flap inclines in the direction of the actuator pressure chamber having lower liquid pressure. If, for example, a flap is to be deflected downward, liquid is pumped from the lower into the upper actuator pressure chamber or from the lower into the upper tube. The thickness of the lower actuator pressure chamber thus decreases and that of the upper one increases, which presses the flap downward. This activation also has the advantage that the actuator pressure chambers extend along the entire front edge of the flap, because of which only a minor pressure is necessary in order, in the deflected state, to compensate for the torque arising due to the aerodynamic forces on the suspension.

The wing system can advantageously comprise a storage space for the wing structure, wherein the wing structure can be positioned in the storage space in the empty state and the wing structure can be positioned out of the storage space into an airfoil position in the filled state. If all pressure chambers are emptied, the entire airfoil can be rolled or folded up and only still has a minor thickness, for example of approximately 2 cm, and thus requires little storage space in this state. For safety reasons, an entire rescue system, which comprises a parachute, for example, can be provided in the wing system. This can expediently be housed in the storage space in the vicinity of the center of gravity of the aircraft.

The essential properties of the present invention comprise a structure which can be folded, and which can be stowed collapsed or rolled up in multiple layers in a relatively thin housing on the roof of a flying car. A reasonable configuration can be a high-wing monoplane. This structure enables the most aerodynamically efficient fixed wing configuration and therefore the least possible consumption in flight. Furthermore, it offers a high level of failure safety due to separate high-pressure liquid circuits for each tube. The textile wing has a high damage tolerance, since it unfolds again with unrestricted carrying capacity after it has been bent, for example, by a gust of wind. The wing system is distinguished by a low weight in the driving mode. Textile control flaps can also be integrated in the wing. The load-bearing capacity can be adapted to different requirements, for example, by a changing cross section of the tubes over the length. A liquid suggests itself as a pressure medium, since it is nearly incompressible and therefore hardly expands if a tube bursts. Even if very high pressures, in particular of greater than 150 bar, are present in the tubes, the liquid therefore hardly expands upon failure of a pressure chamber or a tube. If an air-filled tube having the same pressure were to burst, this would be unacceptably dangerous in the broad surroundings. However, the overstretched fibers of a fabric tube constrict again when the pressure decreases. Therefore, a jet-shaped liquid escape can nonetheless occur. These water jets of a bursting tube can advantageously be held back by the cover, however, which encases the entire wing. For this reason, it can be reasonable to manufacture the cover from a more tear-resistant material than is typically used, for example from a tear-resistant synthetic fiber. Aramids suggests themselves for this purpose, for example, in particular Kevlar. A pressure chamber or a pressure tube filled with liquid therefore advantageously offers a higher level of operational safety for persons in the vicinity than gas-filled pressure chambers or pressure tubes. Furthermore, the integration of the technology required for flying does not restrict the use as a "normal" family passenger vehicle.

The wing system can advantageously comprise a tail beam, wherein the tail beam can be rotatably mounted at the height of half the depth of the wing structure.

Even the weight of the unfilled airfoil can still be sufficiently high that it cannot be comfortably handled by every person during setup. A load-bearing setup aid can therefore be necessary. The tail beam can advantageously be used as a setup aid for the airfoil. The tail beam can be designed so it can be divided for this purpose and can be rotatably mounted in the center of the vehicle approximately the height of half the wing depth. Due to the ability to divide it along the longitudinal axis of the tail beam, one half can be used in each case for wing structure on the respective side of the means of transportation as a setup aid. The tail beam can expediently have a U-profile open downward, which can be moved in three segments telescopically one inside another, wherein a slide can be installed displaceably in the longitudinal direction in the gap of the U-profile. A beam can expediently be fastened thereon, which can be guided through a pipe at the wingtip and can be fastened secured against rotation. This pipe extends along the axis of the rolled wing. After the beam is inserted, it carries along the laterally extended tail beam in the direction of the wingtip. If the beam reaches the location of the wing support, it is fastened as a further support. As soon the wing structure is completely unrolled, it can be filled with liquid and pressurized, so that the wing structure can support its own weight. The beam of the setup aid can then be detached and stowed. The tail beam can also be folded to the rear, against the forward direction of the transport device, and connected using bolts to the other half of the tail beam of the other wing side. After the supports of the tail beam under the subfloor of the car have been pulled out to the rear and fastened to the tail beam, the tail beam can be unrolled. For reasons of weight and due to lower span width and lower aerodynamic forces, the tail beam can be air-filled. A compressor can be provided for this purpose, which can also be housed in the end piece of the tail beam due to its size. This offers the advantage that the construction is made significantly lighter, since there is no necessity of transporting liquid along the tail beam. The high-pressure circuit of the liquid can thus be kept as compact as possible.

Vice versa, the wing structure can expediently be activated before being rolled in. The setup aid is subsequently inserted into the pipe on the wingtip and secured against rotation. An electric motor can be provided which is attached to the pipe of the setup aid and ensures that the wing structure is rolled in while the slide on the tail beam moves in the direction of the wing root.

Furthermore, it can be provided that in a first tubular pressure chamber of the wing system, a second tubular pressure chamber having smaller diameter is introduced coaxially to the first pressure chamber, so that a higher liquid pressure is applied in the second pressure chamber than in the first pressure chamber. Due to the use of double-walled pressure chambers or pressure tubes, inadequate pressure resistance of a pressure chamber or a pressure tube can advantageously be compensated for. If a second pressure chamber having equal pressure resistance or a second pressure tube having somewhat smaller diameter is inserted coaxially into a pressure chamber or into a pressure tube which is designed for pressure of $p_{max}$, the inner pressure chamber or the inner pressure tube can be subjected to twice the maximum pressure, thus $2 \cdot p_{max}$. For this purpose, it is only necessary for the maximum pressure $p_{max}$ to be applied in the small gap between the two pressure chambers or pressure tubes, since the maximum differential pressure over each wall of the pressure chambers or the pressure tubes cannot exceed the maximum pressure $p_{max}$ in each case.

The arrangement of the wing system according to the invention on a transport device for traveling on land, in particular on an automobile, offers the advantage that the STOL capability is provided in a simple manner. In comparison to conventional aircraft, a comparatively large undercarriage is provided, which can additionally be driven. This can contribute to accelerating the transport device during takeoff, to thus reach the liftoff speed faster. The braking system of a car, in particular having an ABS system, enables faster deceleration after landing due to the profiled contact surface of the passenger vehicle tires, which are larger in comparison to the tires of a small airplane.

Conventional internal combustion engines can advantageously be used for driving on land and for flying. In one embodiment, for example, a propeller can be operated using an internal combustion engine.

At least one container for the liquid of the wing system can expediently be arranged in the transport device near ground level with respect to the underlying surface during the movement on land, preferably in the half of the transport device used for the wing system, wherein the at least one container is configured to accommodate the liquid during the operation as a vehicle for traveling on land and the wing system is configured to accommodate the liquid during the operation as an aircraft for traveling in the air. Furthermore, the transport device can comprise a pump system for pumping the liquid from the at least one container into the wing system. To further reduce the required amount of liquid, for example, a higher liquid pressure can be applied due to the use of high-pressure resistant fibers, which in turn permits a smaller cross section of the pressure chamber or the pressure tube.

The transport device in one embodiment can advantageously comprise at least one electric motor for movement and can comprise a redox flow battery as an energy carrier, which comprises an electrolyte, wherein the electrolyte can be filled in the at least one pressure chamber of the wing structure of the wing system under high pressure. The transport device can expediently comprise at least one electric motor for movement. This motor can be configured, for example, to enable switching over of the force transmission to the axle of the tires for traveling on land or to at least one propeller for traveling in flight propulsion.

It can be particularly advantageous that the electrolyte consists of an anolyte and a catholyte and the transport device comprises at least two separate containers near ground level and at least two pressure chambers in the wing system, wherein separate liquid circuits are provided for the pressure chambers, so that at least one container or at least one pressure chamber is provided in each case for the anolyte and the catholyte.

Alternatively, a redox flow battery can also be used in which only one liquid electrolyte (anolyte) is used and the reaction partner is air (for example ambient air). For example, in this case this is a vanadium-oxygen redox flow battery.

The anolyte can expediently be used as a pressure medium for one wing structure and the catholyte can be used as a pressure medium of another, second wing structure. Alternatively, there is also the possibility that if a plurality of pressure chambers is present within a wing structure, these pressure chambers can be filled with anolyte or catholyte, so that anolyte and catholyte can be accommodated within a wing structure, thus a wing on one side of the transport device. An imbalance in the amount or the weight between anolyte and catholyte can thus be balanced out, for example.

Furthermore, if only one single electrolyte (anolyte) is provided, separate pressure areas or separate wing structures can be filled with only the single electrolyte.

In order that the pressure medium can be used at the same time as an energy source for the redox flow battery, it is advantageous that pressure medium can be exchanged in operation. For this purpose, two vertical pressure tubes lying one over another of a spar can each be connected to the wingtip. They thus form a recumbent U, so that the electrolyte can be pumped at the wing root into one of the pressure tubes and exits in turn from the other at the wing root. If, for example, two tubes adjacent to one another on the lower or upper side of a spar were connected, which consists of a total of four tubes, the spar could lose nearly its entire carrying capacity upon failure of one pair of tubes. In contrast, if the pressure in two tubes lying one over another were to sink, the spar would only lose half of its carrying capacity. To supply the galvanic cell with electrolyte, all pressure tubes connected together in U-shapes of all spars are opened individually in succession and have flow through them until the electrolyte is completely exchanged. Only one U-shape is expediently always open, while the other is closed, in order to only negatively affect the carrying capacity of this part of the spar in the event of a pressure drop in the electrolyte circuit. Subsequently, the valves of one U-shape are closed and those of the next U-shape are opened. The thinner pressure tubes of the ribs and/or stringers can advantageously also be part of this circuit. Electrolyte can also expediently be used as a working medium for the actuators of the flaps, which does not participate in the exchange in flight, however, because this can be excessively complex and risky. It offers the advantage that it can be viewed as reserve energy after the landing.

To meet the requirements for a flying car that a lower center of gravity is required for a vehicle and a higher center of gravity is required for an aircraft, a liquid energy carrier can advantageously be used. However, the liquid energy carrier cannot be consumed so that is volume is available as a pressure medium over the entire duration of the flight. It can be pumped into tanks close to the ground in the driving mode and can be used as a pressure medium for the textile wing in the flying mode. This is advantageous in particular for a design as a shoulder wing. The volume of liquid required for the wing structures can advantageously be covered using the quantity of electrolyte which is needed due to the required capacity. An amount of approximately 500 L can be provided, for example.

Moreover, the electrolyte can expediently be noncombustible and nonexplosive. Furthermore, electrolytes can also be provided which are nonproblematic for the environment. A further advantage is that an electrolyte can either be loaded or exchanged depending on the situation. The electrolyte can thus be refilled in a simple manner, for example. This can enable short refilling stops even with low range.

Because no additional liquid, such as water, is required for the wing, a possible reduction of the weight and, accompanying this, an increase of the possible payload results as a further advantage. Furthermore, the electrolyte in the wing, in contrast to a battery in the vehicle, advantageously also does not contribute to the particularly critical torque at the wing root.

It is particularly advantageous that the liquid in the liquid circuit of the pressure chamber can additionally be introduced as a cooling liquid within a cooling circuit, wherein the wing structure is usable as a heat exchanger. The pressure chambers of the wing structure can form a part of the cooling circuit for this purpose. The large wing surface is suitable for emitting heat, which additionally contributes to the deicing of the airfoil. Depending on the thermal stability of the electrolyte, it can alternatively advantageously also be used as a cooling liquid, for example for electric motors. A closed high-pressure circuit having heat exchanger at the producer can be provided for this purpose.

BRIEF DESCRIPTION OF THE INVENTION

Figure 3C:
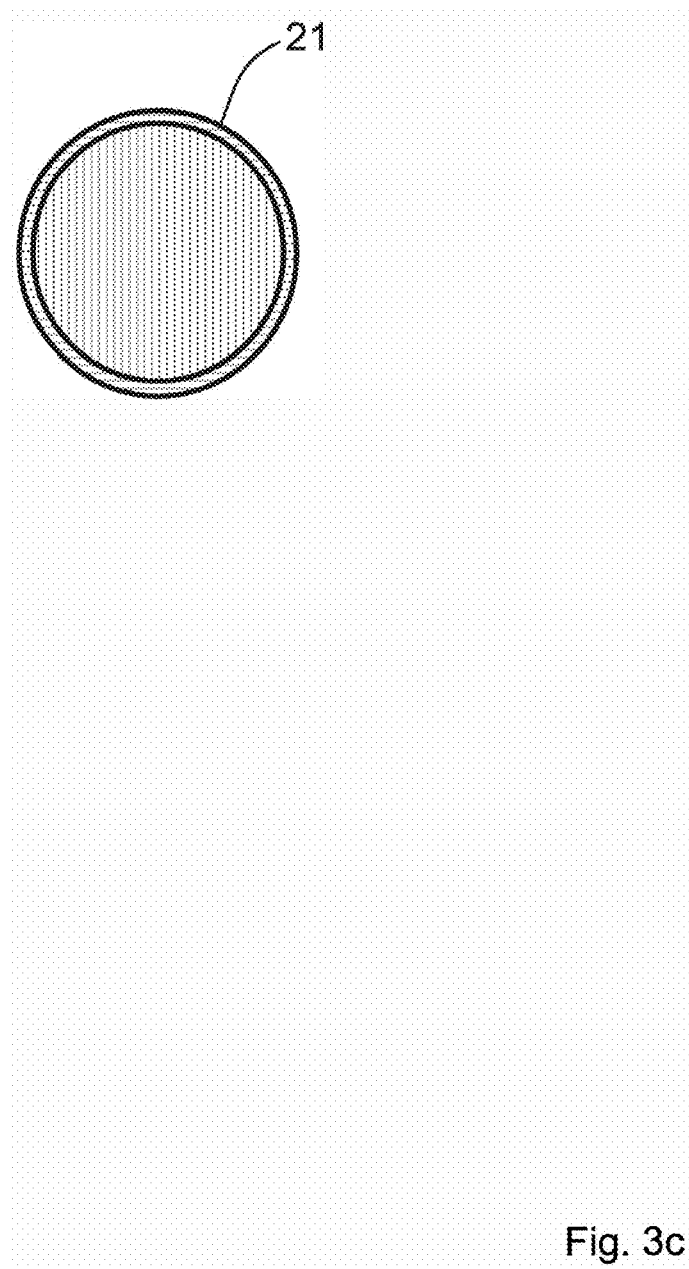
Figure 4A:
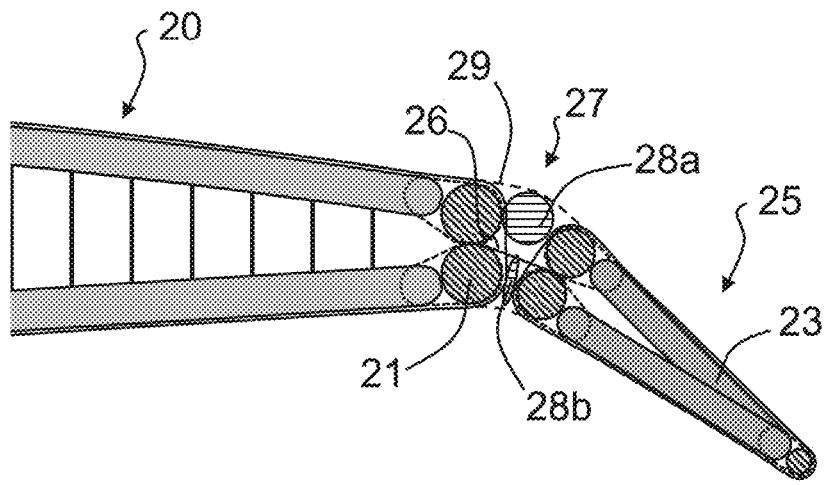
Figure 4B:
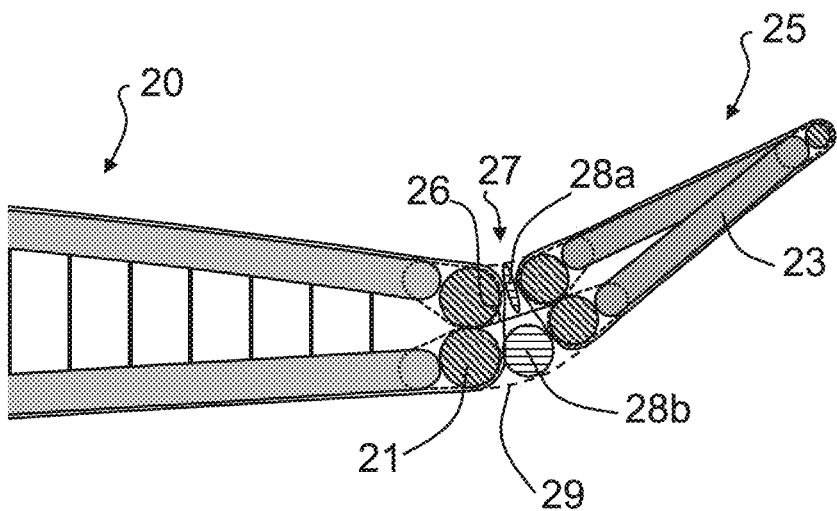

Expedient embodiments of the present invention are explained in more detail hereinafter on the basis of the figures of the drawings. In the figures:

FIGS. 1*a-h* show individual steps for the conversion of a transport device from vehicle to aircraft;

FIG. 2 shows a schematic sectional illustration of a wing structure;

FIGS. 3*a-b* show a schematic detail illustration of a wing structure in cross section;

FIG. 3*c* shows a detail cross-sectional view of a pressure chamber shown in FIG. 3*a*;

FIGS. 4*a-b* show a schematic illustration of the deflection of the control flaps using actuator pressure chambers;

FIG. 5 shows a schematic top view of a wing structure;

FIGS. 6*a-b* show a schematic illustration of the bracing of the spar pressure chambers using bracing threads;

FIGS. 7*a-d* show a schematic illustration of the bracing of the pressure chambers using tension bands;

FIGS. 8*a-b* show a schematic illustration of the attachment of the wing support to the wing structure;

FIG. 9 shows a diagram of the experimentally determined maximum torque of a spar as a function of the deflection; and FIGS. 10*a-b* show a design calculation for implementing the wing system on a transport device.

DETAILED DESCRIPTION OF THE INVENTION

FIG. 1*a* shows the wing system 10 in the installed state on a transport device 1. The wing system shown in FIG. 1*b* comprises a storage space 30 in which the wing structure 20 is housed in an unfilled and rolled-up state. Moreover, a tail beam 40 is housed in the storage space 30 and an electric motor 60 within the transport device 1. This beam can be pivoted upward out of the storage space 20 as shown in FIG. 1*c* and subsequently pivoted out. In the completely folded-in state, the short vertical part of the tail beam 40 shown in FIG. 1*c* rests horizontally on the roof of the transport device 1. It points forward from the fastening point in the center of the roof up to the joint at which the three telescoping parts of the tail beam begin. The tail beam 40 comprises an air compressor and a tail actuator. The tail beam 40 is rotatably mounted and is shown in the pivoted-out state in FIG. 1*d*, so that it is aligned in parallel to the main axis of the wing structure 20. The tail beam 40 is used during the setup of the wing structure 20 as a crane for a mounting aid and for this purpose is designed so it can be divided and is rotatably mounted in the center of the vehicle 1 approximately at the height of half the wing depth. The tail beam 40 consists of two halves that can be connected, so that one half of the tail beam 40 is available as a mounting aid for each wing side.

The tail beam 40 consists of a U-profile open downward, which can be moved in three segments 42 telescopically one inside another. The end piece of the wing structure 20, which is used as the main wing, contains a receptacle 45 in the form of a pipe for the mounting aid. The mounting aid comprises an electric motor 46 for rolling and unrolling, a beam 44, and a slide 43, which is suspended from below in the telescopic tail beam 40. The fabric of the wing structure 20 is not to damage the side of the vehicle 1 nor to rub on the ground during the setup and breakdown. The slide 43 is installed displaceably in the longitudinal direction. A beam 44 is fastened thereon, which can be guided through a receptacle 45 at the wing tip and can be fastened secured against pivoting. This receptacle is located along the rolling and unrolling axis of the rolled-up wing structure 20. After the beam 44 is threaded in, it moves the laterally extended tail beam 40 in the direction of the wingtip. Moreover, a wing support 31 is provided. As soon the slide 43 having the fastened beam 44 and the receptacle 45 reaches the height of the wing support 31, it is fastened as a further support.

Figure 1F:
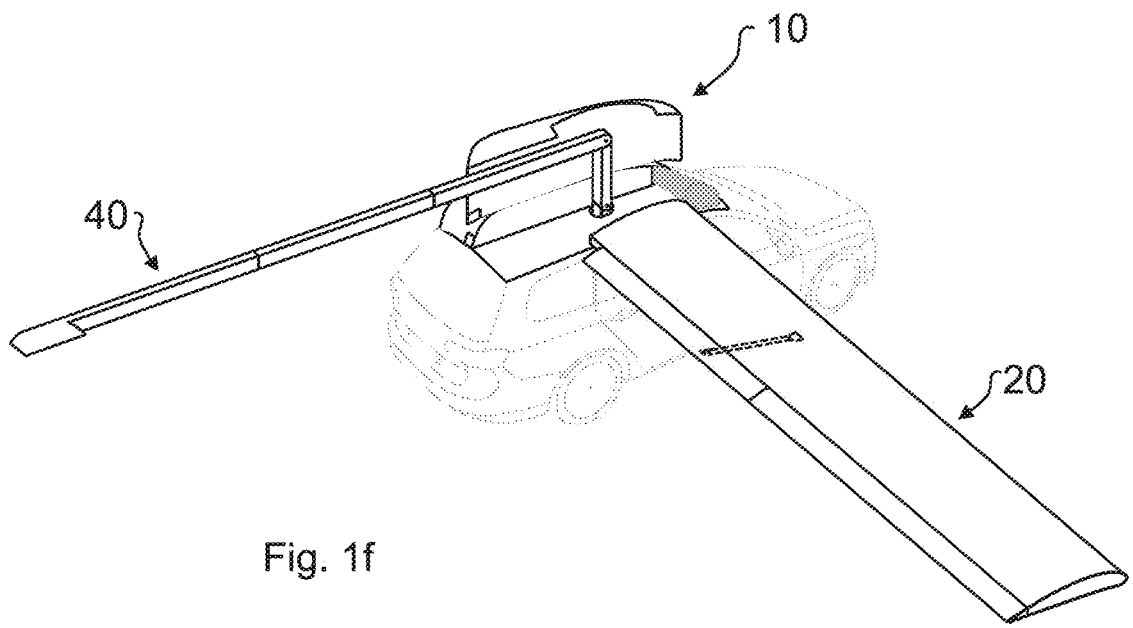

As soon as the wing structure 20 is completely unrolled, it is filled with liquid and pressurized, so that the wing structure 20 supports its own weight itself. The beam 44 of the setup aid is subsequently broken down and stowed. In FIG. 1*f*, the tail beam 40 is shown folded to the rear, so that it points in the reverse direction of the transport device 1. The tail beam 40 is connected by means of bolts to the half of the tail beam 40 of the other side.

FIG. 1*g* shows how supports of the tail beam under the subfloor of the transport device 1 are pulled out to the rear and fastened on the tail beam 40. The tail can be designed as a V-tail. Due to the low span width and the low loads, it only consists of compressed air-filled tubes. In the non-unfolded state, it is located rolled into the box, which also contains the actuators. The tail is shown unrolled and pumped up in FIG. 1*h*. A propeller 50 is also provided, which can be designed, for example, as a two-blade thrust propeller 50. This can be folded and in the passenger vehicle mode, the beam is collapsed into the protrusion indicated by dashed lines. The propeller 50 itself is housed collapsed in a recess transverse to the vehicle 1, horizontally to the ground behind the bumper.

Vice versa, the wing structure 20 is evacuated before the rolling in to achieve the smallest possible packing size. The beam 44 is subsequently inserted into the receptacle 45 at the wingtip 20 and secured against pivoting. The electric motor 46 at the receptacle 45 of the beam 44 then ensures that the wing structure 20 is rolled in while the slide 43 on the tail beam 40 moves in the direction of the wing root.

FIG. 2 shows a wing structure 20 in cross section. It comprises a plurality of pressure chambers 21, which are designed as spar pressure tubes and are filled with liquid at a pressure of approximately 150 bar. The spar pressure chambers 21 form the supporting elements of the wing structure 20. By way of example, two pressure chambers 21 in the front area, six pressure chambers 21 in the middle area, and four supporting pressure chambers 21 in the rear area of the wing structure 20 are shown in FIG. 2. The entire wing structure 20 including the pressure chambers 21 is enveloped by an outer skin fabric 22. This outer skin fabric 22 is used as an outer envelope of the wing structure 20 and has an aerodynamic quality. Moreover, it fulfills the function of a spray protection, for example in case of a bursting pressure chamber 21. The outer skin fabric 22 is expediently manufactured from a tear-resistant synthetic fiber, for example in aramid, such as Kevlar. For the dimensional stability, in addition to the pressure chambers 21, which assume the function of a spar, rib pressure chambers 23 are moreover provided which assume the function of ribs and frames in the wing structure 20. These rib pressure chambers 23 are also filled with a liquid at a pressure of approximately 150 bar. For the additional dimensional stability of the profile, the wing structure 20 additionally has bracing threads 24. These bracing threads 24 having high tensile strength are braced in the longitudinal direction to ensure the dimensional stability of the profile.

FIG. 3*a* and FIG. 3*b* show detail views of the front and rear section of the wing structure 20 in cross section. Three leading edge pressure tubes 15 are shown in FIG. 3*a*. The two leading edge pressure tubes 15 shown round are filled at approximately 3 to 5 bar. The leading edge pressure tube 17 at the tip is filled at approximately 0.5 bar. They are used to maintain the profile shape of the wing structure 20. Moreover, they can be used to deice the airfoil in that warm air flows through them. A net 16 is attached around the leading edge pressure tubes 15, which contributes to the dimensional stability of the profile shape. The net 16 is used to keep the leading edge pressure tube 17 at the wing leading edge in shape. A wing flap 25 is attached in the rear section of the wing structure 20 in FIG. 3*b*. It is fastened by means of bands 26 on the rear part of the wing structure 20 in such a way that a gap 27 forms. Two actuator pressure chambers 28*a*, 28*b* are attached in this gap 27, wherein one actuator pressure chamber 28*a* is arranged above the bands 26 and one actuator pressure chamber 28*b* is arranged below the bands 26. These actuator pressure chambers 28*a*, 28*b* are filled at a low pressure of approximately 0.5 bar. They offer the possibility of an actuation of the wing flap 25 that can be rolled up. Due to the large area of the actuator pressure chambers 28*a*, 28*b*, only a small differential pressure between upper and lower pressure chamber is required for the activation. The gap 27 and the actuator pressure chambers 28*a*, 28*b* are enclosed using an elastic envelope 29, which is used as a gap cover and also has an aerodynamic quality.

Schematic illustrations of the deflection of the control flap 25 using actuator pressure chambers 28*a*, 28*b* are shown in FIG. 4*a* and FIG. 4*b*. The control flap 25 is deflected by pumping water over from one to the other side, so that, for example, in the event of a deflection downward, the upper tube 28*a* contains more water than the lower tube, as shown in FIG. 4*a*. Due to the high tensile strength of the fastening band 26 and the large contact area of the actuator tubes 28*a*, 28*b*, the required torques can be generated.

FIG. 5 shows a top view of the wing structure 20. The leading edge pressure tubes 15 extend along the front edge of the wing structure 20. The pressure chambers 21 extend along the entire longitudinal axis of the wing structure 20. The rib pressure tubes 23 in the center of the wing structure 20 extend in a zigzag pattern at an angle of approximately 45° to the longitudinal axis of the wing structure 20. The rib pressure tubes 23, which are positioned at the front and at the rear end of the wing structure, extends in a meandering shape and are alternately fastened on the upper and on the lower spar pressure chamber 21. The bracing threads 24 in the middle of the wing structure 20 extend in the longitudinal direction of the wing structure 20 and are used for the dimensional stability of the pressure tubes which represent the ribs. The bracing threads 24 which are positioned at the front and at the rear end of the wing structure describe a Y-shape having an angle of 45° or 90° to the longitudinal direction of the wing structure 20. They are used to keep the rib pressure tubes 23 in the illustrated shape even in the filled state under high pressure.

Possible bracings of the spar pressure chambers 21 are shown in FIG. 6*a* and FIG. 6*b*. The spar pressure chamber 21 is fixed in this case at the left end, so that the right end, in particular the section R, represents the free end. A first possibility is shown in FIG. 6*a* in a side view and associated top view. Separate bracing threads are used in this case. The bracing thread 24 shown by a solid line in section R in the side view shows the bracing thread 24 for the loading of the right free end of the spar downward. The bracing thread shown by dashed lines in section R in the side view shows the analogous profile of the bracing thread for the loading of the right free end of the spar upward. A second possible design is shown in FIG. 6b. The braided envelope of the pressure chamber 21 is formed here from threads which are positioned at a 45° angle to the longitudinal axis of the pressure chamber 21. They are flexibly connected to the pressure tube 21 on the upper side and the lower side by a rubber coating. It is advantageous to brace each two tubes located one above another only in sections in segments abutting one another using bands (for example over the length of a wing approximately 10 bracings as shown in FIG. 6a) or to encase them using a 45° fabric (as shown in FIG. 6b). In this bracing, it is also unimportant whether the spar consists of a total of four, six, or more tubes, since they are always only connected in pairs.

FIGS. 7a-d show schematic illustrations of the bracing of the pressure chambers 21 using tension bands 18. The tension bands 18 are used to increase the torsional rigidity of the wing structure 20. The tension bands 18 shown by solid lines are used to absorb right-handed torques. For the sake of clarity, the location of the tension bands 18 for absorbing left-handed torques is indicated by dashed lines. An overview of the wing structure is shown in FIG. 7a. The tension bands 18 around the pressure chambers 21 front area of the wing structure 20 are shown in detail in FIG. 7b. The tension bands 18 extend from the right in the double strand over the upper pressure chamber 21 counterclockwise. The double strands of the tension bands 18 divide at the lower pressure chamber 21, so that one strand of the tension bands 18 extends clockwise and the second strand extends counterclockwise around the lower pressure chamber 21 in FIG. 7b. The tension bands 18 around the pressure chambers 21 in the rear area of the wing structure 20 are shown in detail in FIG. 7c. The tension bands 18 extend from the left in the double strand below and along the lower pressure chamber 21, counterclockwise. The double strand of the tension bands 18 divides at the upper pressure chamber 21 so that one strand of the tension bands 18 extends clockwise and the second strand extends counterclockwise around the upper pressure chamber 21 in FIG. 7c. The tension bands 18 around the pressure chambers 21 in the middle area of the wing structure 20 are shown in detail in FIG. 7d. The tension bands 18 which come from the left from the front pressure chambers 21 extend in the double strand below and along the lower left pressure chamber 21. The double strand of the tension bands 18 divides at the middle lower pressure chamber 21 so that one strand of the tension bands 18 extends clockwise and the second strand extends counterclockwise around the middle lower pressure chamber 21 in FIG. 7d. The tension bands 18 which come from the right from the rear pressure chambers 21 extend in the double strand above and along the upper right pressure chamber 21. The double strand of the tension bands 18 divides at the middle upper pressure chamber 21, so that one strand of the tension bands 18 extends clockwise and the second strand extends counterclockwise around the middle upper pressure chamber 21 in FIG. 7d.

Schematic illustrations of the attachment of the wing support to the wing structure are shown in FIG. 8a and FIG. 8b. The wing support is shown in a side view in FIG. 8a and in a view from below in FIG. 8b. Bracing threads 34 are attached to the pressure chambers 21 in FIG. 8a, which are laid in a U-shape over two pressure tubes 21 of the spar located one above another and protrude downward out of the wing profile. These bracing threads 34 are guided through a pressure plate 33, which is used as a wing support, and subsequently secured using a bolt 32. The bolt 32 is pushed through the loops of the bracing threads 34 when the spar pressure tubes 21 are filled but not yet under maximum pressure. The expansion of the pressure tubes 21 braces the bracing threads 34 of the receptacle and ensures a solid connection to the pressure plate 33 of the wing support.

Individual combinations of features (sub-combinations) and possible combinations of individual features of different embodiments which are not shown in the figures of the drawings are expressly also comprised by the content of the disclosure.

In an experiment, it is to be determined which torques a real spar can absorb in comparison to the theoretical maximum value. For this purpose, the ratio between the maximum transverse force $F_{max,real}$ and the theoretical value $F_{max}$ is determined, for which the following applies: $F_{max,real} = \varphi \cdot F_{max}$. This value of $\varphi$ is dependent in particular on the elongation of the materials used under load. It is thus not a generally valid value. The more tensile strength the fibers of the tubes and bands have, the higher the value is of $\varphi$. For a first design calculation, however, it is nonetheless important to know the order of magnitude of this factor. In addition, it is possible that the spar has an unexpected failure mode, such as buckling laterally, because of which it is important to carry out a test in the original scale. The spar which was used for the experiment documented here has a length of 4 m.

The snow cannon feed tube GH Snowblast having an internal diameter of 38 mm, a weight of 500 g/m, a wall thickness of 4 mm, and a bursting pressure of 150 bar was used for the experiments as a pressure tube. In some tests, the bursting pressure was on average up to 165 bar. For the bracing bands, a GOKU 2 hybrid 2.5 cm Slack Mountain slackline having a width of 25 mm, a thickness of 2 mm, an elongation at fracture of 40 kN, an elongation of 3.8% at a tensile force of 10 kN, and a weight of 41 g/m was used for the bracing bands. The pressure-resistant end fittings of the tubes consist of pipes inserted into the tube. They are provided with two channels for the clamping rings pushed over the tube. On one side, a pressure fitting is located, the other side is closed using an end fitting. An end piece is attached to the free end of the spar, which fixes the four end fittings of the tubes and has the clamping of bracing bands which extend at an angle of 45° to the axis of the pressure tube. So as not to corrupt the measurement of the torques on the spar due to the weight of the spar end piece, its weight is compensated for the measurement using a counterweight the pressure fittings and the receptacle of the bracing bands attached at a 45° angle are located on the clamped side of the spar. The aerodynamic forces engaging on an airfoil or constant over the span width with the exception of the area close to the wingtip. At some intersection points of the bracing bands attached at a 45° angle, clamps are attached, which contribute to the dimensional stability of the spar.

The force was measured which is required to deflect the spar by a specific amount. For this purpose, the spar was deflected in fixed steps of 5 cm each in the center of the spar and its counterforce was determined. This force is shown in the diagram in FIG. 9. The force is converted here into a torque around the fixed clamping of the spar in relation to the theoretically possible maximum torque, with completely relieved bands on the upper side. Two passes were measured having different guiding of the load-absorbing bands. The two dashed curves having greater stroke thickness are associated with the arrangement which has proven to be the best. The curves of the first measurement series (thin stroke thickness), in which simply only one band was braced in parallel to the upper and lower side, are also shown for the sake of completeness. One finding from the measurement is that the force which the bar can absorb increases linearly with the deflection. Furthermore, it is clear that the maximum deflection applied here is not yet sufficient to reach the maximum force, at which the bracing bands on the upper side can no longer absorb tensile force. From this value, the force or the torque component would no longer increase upon further deflection. The efficiency or the torque component is obviously not dependent on the pressure, rather only on the deflection. The absolute value of the force which the spar can bear is directly proportional to the pressure, however.

On the basis of these measurement results, a value of p=0.6 is assumed in the following design calculations, which corresponds to an estimation of the asymptotic maximum value of the curve "60 bar, 2nd test" in the diagram in FIG. 9. This value thus means that the bracing bands on the upper side can still absorb 20% of the compressive force of the water in this case. This 20% has to be compensated for by the bracing bands of the lower side, so that only the torque remains for the load absorption which is absorbed by the compensation of the remaining 60% of the compressive force of the water by the lower bracing bands. An unexpected failure mode, such as lateral buckling of the spar upon deflection, did not occur with the guiding and clamping of the bracing bands used here.

A vehicle weight of 2200 kg is presumed for the design. This value also includes the wing structure, which is necessary for the flight mode. In the design of the wing structure, it is presumed that a wing support is provided as is typical in small aircraft. The end result of the design calculation is shown in FIGS. 10a-b. It is thus demonstrated that an implementation of the textile airfoil for the intended use is possible using materials already presently available. The amount of water can be reduced by the production of tubes adapted specially for this intended use, for example having a decreasing cross section over the length. A significant reduction of the amount of water is possible if more pressure-resistant tubes are used, for example due to graphene-coated fibers. Smaller tube cross sections are thus necessary, which advantageously significantly reduces the wing weight in the flight state.

LIST OF REFERENCE NUMERALS 1 transport device
10 wing system (airfoil system)
15 leading edge pressure tube (round)
16 net (around leading edge pressure tube)
17 leading edge pressure tube
18 tension bands
20 wing structure
21 pressure chamber (spar)
22 outer skin fabric
23 rib pressure chamber
24 bracing threads
25 wing flap
26 bands
27 gap
28 actuator pressure chamber
29 elastic envelope
storage space
31 wing support
32 bolts
33 pressure plate (wing support)
34 bracing threads (wing support)
40 tail beam
41 U-profile
42 segment
43 slide
44 beam
45 receptacle
46 electric motor (mounting aide)
50 propeller

The invention claimed is:

1. A wing system, comprising:
a stowable aerodynamic wing structure configured to be rolled and/or folded,
the wing structure comprising spars having a plurality of pressure chambers made of a flexible material, which extends along a span width of the wing structure, and
a tear-resistant outer skin fabric, which encases the wing structure,
wherein the pressure chambers are arranged extending adjacent to one another and/or one over another in a filled state;
wherein the pressure chambers of the wing structure are fillable with a liquid, and the wing system comprises a pump system, wherein the liquid is held at pressure over 50 bar in the pressure chamber; and
wherein the pressure chambers are connected to one another with bracing threads to increase dimensional stability of the wing structure.

2. The wing system as claimed in claim 1, wherein the wing system comprises a storage space for the wing structure, wherein the wing structure is positioned in the storage space in an empty state and the wing structure is positioned in a filled state out of the storage space into an airfoil position.

3. The wing system as claimed in claim 1, wherein the wing system comprises a wing flap, which comprises pressure-tight tubular pressure chambers made of a flexible material, wherein the wing flap is fastened on the wing structure using bands, wherein the bands extend in a longitudinal direction of the wing structure from a rear edge of the wing structure to a front edge of the wing flap, so that a gap forms between the rear edge of the wing structure and the front edge of the wing flap, wherein at least two actuator pressure chambers are arranged in the gap in parallel to the rear edge of the wing structure, wherein at least one actuator pressure chamber is arranged above the bands and at least one actuator pressure chamber is arranged below the bands.

4. The wing system as claimed in claim 1, wherein the wing system comprises a tail beam, wherein the tail beam is rotatably mounted, at the height of half the depth of the wing structure, wherein the tail beam has a U-profile open downward, which is movable in multiple segments in three segments, telescopically, one inside another, wherein a slide is installed displaceably in a longitudinal direction in the U-profile, wherein a beam is fastened on the slide, which is guided to a tip of the tail beam through a receptacle.

5. The wing system as claimed in claim 1, wherein a second, tubular pressure chamber having smaller diameter is introduced in a first, tubular pressure chamber coaxially to the first pressure chamber, so that a higher liquid pressure is applied in the second pressure chamber than in the first pressure chamber.

6. The wing system as claimed in claim 1 wherein the pressure spars are braced against one another by tension bands.

7. The wing system as claimed in claim 1, wherein the pressure chambers extend meandering or zigzagging in a direction transverse to the span width along the wing structure.

8. The wing system as claimed in claim 1, wherein the liquid is held over 100 bar in the pressure chamber.

9. A transport device configured as an aircraft for traveling in the air and as a vehicle for traveling on land, wherein the transport device comprises a wing system as claimed in claim 1, which is attached to the upper side of the transport device.

10. The transport device as claimed in claim 9, wherein at least one container for the liquid of the wing system is arranged proximate ground level with respect to an underlying surface during movement on land, in a half of the transport device facing toward the underlying surface, in a half of the transport device opposite to the wing system, wherein the at least one container is configured for accommodating the liquid during operation as a vehicle for traveling on land and the wing system is configured to accommodate the liquid during operation as an aircraft for traveling in the air, and comprises at least one pump system for pumping the liquid out of the at least one container into the wing system.

11. The transport device as claimed in claim 9, wherein the transport device comprises at least one electric motor.

* * * * *